United States Patent
Yamada et al.

(10) Patent No.: US 7,518,697 B2
(45) Date of Patent: Apr. 14, 2009

(54) LIQUID CRYSTAL DISPLAY DEVICE INCLUDING A PLURALITY OF COLUMNAR SPACING STRUCTURES AND SUBSTRATE TO BE USED WITH SUCH A LIQUID CRYSTAL DISPLAY DEVICE

(75) Inventors: Naoshi Yamada, Tsu (JP); Toshihide Tsubata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 425 days.

(21) Appl. No.: 11/144,427

(22) Filed: Jun. 3, 2005

(65) Prior Publication Data

US 2005/0270472 A1 Dec. 8, 2005

(30) Foreign Application Priority Data

Jun. 3, 2004 (JP) ............................. 2004-165597
May 26, 2005 (JP) ............................. 2005-154519

(51) Int. Cl.
*G02F 1/1339* (2006.01)
(52) U.S. Cl. ....................................... 349/156; 349/155
(58) Field of Classification Search .......... 349/155–157
See application file for complete search history.

(56) References Cited

U.S. PATENT DOCUMENTS

| 5,978,061 | A  | * | 11/1999 | Miyazaki et al. ............. 349/155 |
| 6,275,280 | B1 | * | 8/2001  | Kajita et al. ................. 349/155 |
| 6,327,015 | B2 | * | 12/2001 | Awane et al. ................ 349/158 |
| 6,734,944 | B1 |   | 5/2004  | Koseki et al. |

FOREIGN PATENT DOCUMENTS

| JP | 10-048641  | 2/1998 |
| JP | 11-002718  | 1/1999 |
| JP | 11-248921  | 9/1999 |
| JP | 2001-117103 | 4/2001 |

\* cited by examiner

*Primary Examiner*—Andrew Schechter
*Assistant Examiner*—Lauren Nguyen
(74) *Attorney, Agent, or Firm*—Keating & Bennett, LLP (57) ABSTRACT

It is intended to facilitate optimization of the configuration and distribution density of columnar spacers for realizing a liquid crystal display device having reduced low-temperature voids, lower bulging, and pressure-induced unevenness. A method of producing a substrate for a liquid crystal display device includes the steps of: providing a sample substrate; forming a columnar spacing structure sample on the sample substrate, the columnar spacing structure having at least one resin layer; determining a spring modulus $k_0$(mN/μm) of the columnar spacing structure sample and a cross-sectional area $Sps_0$ of a smallest portion of the columnar spacing structure sample, and calculating a spring modulus $Kps(=k_0/Sps_0)$ of the columnar spacing structure sample per unit area; and with respect to an area S of a display region of the liquid crystal display device, a cross-sectional area Sps of a smallest portion of a columnar spacing structure to be formed on the substrate for the liquid crystal display device, and a number n of columnar spacing structures in the display region, prescribing the number n of columnar spacing structures and the cross-sectional area Sps of the smallest portion so that a spring modulus Kpt per unit area of display region, defined as Kps×(Sps×n/S), is within a range of no less than 0.00008 mN/μm³ and no more than 0.00237 mN/μm³.

17 Claims, 5 Drawing Sheets

Step (a) — Determine Configuration, Material, and Production Process of Columnar Spacing Structure Sample Step (b) — Produce Columnar Spacing Structure Sample Step (c) — Measure Cross-Sectional Area $Sps_0$ of Smallest Portion and Spring Modulus $k_0$ of Columnar Spacing Structure Sample Step (d) — Calculate Spring Modulus Kps of Each Columnar Spacing Structure per Unit Area ($Kps=Kps_0=k_0/Sps_0$)

Step (e) — Using Determined Spring Modulus Kps, calculate Spring Modulus Kpt per Unit Area of Display Region (Kpt=Kps × (Sps × n/S)), based on: Area S of Display Region of Liquid Crystal Display Panel to be produced; Cross-Sectional Area Sps of Smallest Portion of each Columnar Spacing Structure; and Number n of Columnar Spacing Structures in Display Region. Set n and Sps so that Kpt satisfies 0.00008 mN/μm³ ≦ Kpt ≦ 0.00237 mN/μm³

Step (a): Determine Configuration, Material, and Production Process of Columnar Spacing Structure Sample

Step (b): Produce Columnar Spacing Structure Sample

Step (c): Measure Cross-Sectional Area $Sps_0$ of Smallest Portion and Spring Modulus $k_0$ of Columnar Spacing Structure Sample Step (d): Calculate Spring Modulus Kps of Each Columnar Spacing Structure per Unit Area ($Kps=Kps_0=k_0/Sps_0$)

Step (e): Using Determined Spring Modulus Kps, calculate Spring Modulus Kpt per Unit Area of Display Region ($Kpt=Kps \times (Sps \times n/S)$), based on: Area S of Display Region of Liquid Crystal Display Panel to be produced; Cross-Sectional Area Sps of Smallest Portion of each Columnar Spacing Structure; and Number n of Columnar Spacing Structures in Display Region. Set n and Sps so that Kpt satisfies $0.00008 \text{ mN}/\mu m^3 \leq Kpt \leq 0.00237 \text{ mN}/\mu m^3$

LIQUID CRYSTAL DISPLAY DEVICE INCLUDING A PLURALITY OF COLUMNAR SPACING STRUCTURES AND SUBSTRATE TO BE USED WITH SUCH A LIQUID CRYSTAL DISPLAY DEVICE

BACKGROUND OF THE INVENTION

1. Field of the Invention

The present invention relates to a liquid crystal display device having columnar spacers, a substrate to be used therefor, and methods for producing such a liquid crystal display device and such a substrate.

2. Description of the Related Art

Liquid crystal display devices are gaining higher performance as the range of their applications becomes broadened. In particular, display modes having broad viewing angle characteristics, e.g., MVA and IPS, have been developed and are receiving further improvements.

In order to improve the display quality of a liquid crystal display device, it is necessary to accurately control the thickness (which may also be referred to as the "cell gap" or "cell thickness") of the liquid crystal layer, regardless of which display mode is adopted. In particular, in large-sized liquid crystal display devices which have come into use in the recent years, it is necessary to uniformly control the cell gap across a large area.

The cell gap is controlled by spacers which are disposed on a pair of opposing substrates, between which a liquid crystal layer is interposed. Conventionally, fibrous or granular spacers (e.g., plastic beads) are used as spacers, which are disposed by being spread over the substrate. However, this technique of spreading plastic beads cannot control the positions at which the spacers will be disposed, and therefore disturb the orientations of the liquid crystal molecules in each pixel. If the liquid crystal molecule orientations within each pixel are disturbed, the disturbance may be visually recognized as display "coarseness". Moreover, variations in the cell gap may occur due to the underlying protrusions and depressions of the substrate, thus causing display unevenness.

Therefore, in recent years, it is commonplace to adopt a technique of forming columnar spacers on a substrate through a photolithography process using a photosensitive material. The spacers which are formed by this technique may be referred to as "columnar spacers", "dot spacers", or "photo-spacers".

Figure 6A:
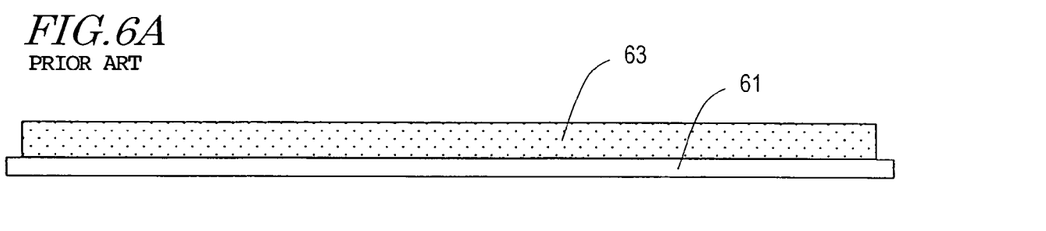
FIGS. 6A, 6B, and 6C are diagrams illustrating steps of a common method for producing columnar spacers.
Figure 6B:
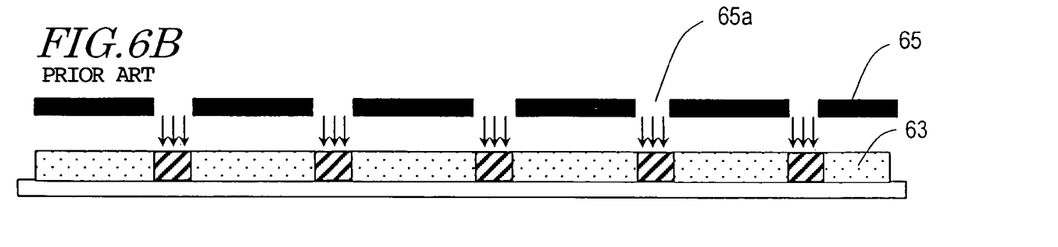
Figure 6C:
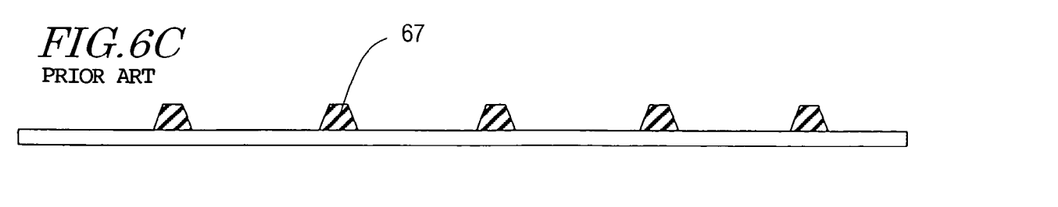

Referring to FIGS. 6A to 6C, a common method for producing columnar spacers will be described.

First, as shown in FIG. 6A, a photosensitive resin is applied to the substrate 61 by a spin coating technique, for example, thus forming a photosensitive resin layer 63. As the photosensitive resin, a photocurable resin (negative-type photoresist) such as an acrylic resin is used. As light for causing the cure, ultraviolet (UV) is often used.

Next, as shown in FIG. 6B, the photosensitive resin layer 63 is exposed through a photomask 65 having openings (light-transmitting portions) 65a in predetermined positions.

Thereafter, the photosensitive resin layer 63 after the exposure is subjected to development, and by removing the uncured photosensitive resin in the regions which were not irradiated with light, columnar spacers 67 at predetermined positions are obtained as shown in FIG. 6C. If necessary, post-baking at a temperature of about 200° C. to 250° C. is performed.

Figure 7:
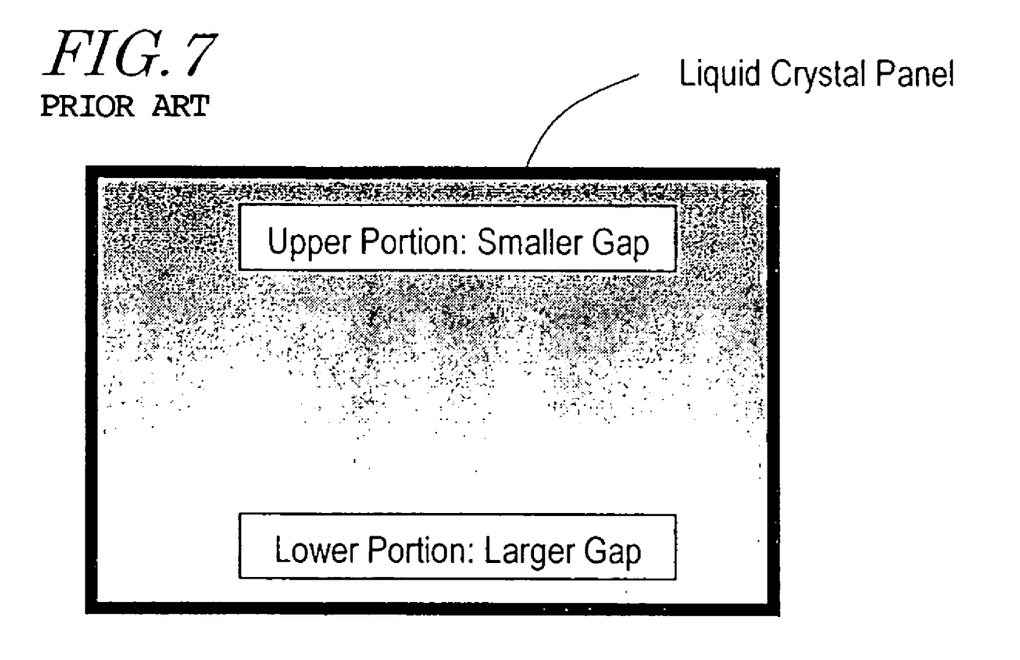
FIG. 7 is a schematic diagram for explaining "lower bulging".

It is known that not only the positions but the distribution density of the spacers (i.e., how densely the spaces are provided) also affect the display quality. For example, if the distribution density of the columnar spacers is too high, the columnar spacers will not be able to follow the changes in thickness of the liquid crystal layer that occur due to thermal contraction and expansion of the liquid crystal material. Thus, especially at low temperatures, "low-temperature voids" may occur. Moreover, as schematically shown in FIG. 7, when the liquid crystal display device (liquid crystal panel) is placed in a vertical posture, the liquid crystal material will gather toward the lower part of the panel due to gravity, thus causing variations in the gap. Among other problems, this results in unevenness in luminance (hereinafter this phenomenon will be referred to as "lower bulging") On the other hand, if the distribution density of the columnar spacers is too small, there will not be enough mechanical strength, so that cell gap variations may occur in response to pressing of the display surface (hereinafter referred to as "pressure-induced unevenness"). Therefore, it is imperative that the columnar spacers be provided at an appropriate density.

Therefore, it is described in Japanese Laid-Open Patent Publication No. 9-73088, for example, that the aforementioned problems can be prevented by ensuring that the columnar spacers account for a cross-sectional area of 0.0001 to 0.002 mm$^2$ per mm$^2$. Moreover, Japanese Laid-Open Patent Publication Nos. 11-2718 and 2001-117103 disclose setting the area ratio of the columnar spacers in the range of 0.05% to 1.5% in order to prevent the above problems.

Moreover, Japanese Laid-Open Patent Publication No. 2000-321580 describes that an excellent liquid crystal display device can be provided by setting the area ratio (occupancy) of the columnar spacers in the range of 0.05% to 0.86% and also setting the hardness value (DH=K+Pmax/hmax2, where K is a constant; Pmax is a maximum load; and hmax is a maximum displacement) of the columnar spacers within a predetermined range.

However, the inventors of the present invention conducted studies to find that the aforementioned laid-open patent publications all fail to describe necessary conditions, and, in fact, the aforementioned problems (especially "lower bulging") cannot be sufficiently suppressed even by producing a liquid crystal display device so as to satisfy the stipulated parameter ranges. For example, in Table 2 (described below) of experimental results, Sample No. 13 is illustrated which has a column area ratio P of 0.00105 and satisfies the conditions stipulated in Japanese Laid-Open Patent Publication Nos. 9-73088 (supra) and 11-2718 (supra). As for Sample No. 23, which is a variant of Sample No. 13 using a material (E) having a spring modulus of 2.40 mN/μm$^3$ as the material of the columnar spacers, the column "lower bulging" reads "×" (i.e., unevenness is recognized even through a neutral-density filter (transmittance: 10%) for cameras).

In particular, in the case of a liquid crystal display device with a complicated configuration, if columnar spacers are formed on a structure including a resin layer (e.g., a color filter layer), it may be difficult to obtain a good display device even if the distribution density of the columnar spacers remains in the predetermined parameter ranges, depending on the physical characteristics (spring modulus) of the resin layer which is in direct or indirect contact with the columnar spacers. Therefore, in order to determine the configuration and distribution density of the columnar spacers for obtaining a good display device, repetitive trial-and-error efforts are required. In order to avoid trial-and-error efforts, it would be necessary to dispose the columnar spacers in a region where there is no resin layer, for example, thus resulting in limitations on the available configuration. Furthermore, the designing methodology for the columnar spacers in the display region and the outlying peripheral region has hitherto been unclear. There have been situations where an inappropriate columnar spacer design in the peripheral region resulted in variations in cell gap around the display region, and hence unevenness in luminance.

SUMMARY OF THE INVENTION

In order to overcome the problems described above, preferred embodiments of the present invention provide a method for optimizing, more easily than conventionally, a configuration and distribution density of columnar spacers for obtaining a liquid crystal display device in which "low-temperature voids", "lower bulging", and "pressure-induced unevenness" are suppressed, and which can provide a good display quality with little unevenness in luminance associated with cell gap variations.

A liquid crystal display device according to the present invention comprises a plurality of columnar spacing structures provided between a pair of substrates, each of the plurality of columnar spacing structures including at least one resin layer, wherein a spring modulus Kpt per unit area of display region is within a range of no less than 0.00008 mN/μm$^3$ and no more than 0.00237 mN/μm$^3$, the spring modulus Kpt being defined as k×n/S, where k is a spring modulus of each columnar spacing structure (mN/μm); S is an area of a display region; and n is a number of columnar spacing structures in the display region.

Preferably, the spring modulus Kpt per unit area of display region is equal to or greater than 0.00018 mN/μm$^3$.

Preferably, the spring modulus Kpt per unit area of display region is equal to or less than 0.0005 mN/μm$^3$.

In one embodiment, each of the plurality of columnar spacing structures includes a plurality of resin layers.

In one embodiment, the plurality of resin layers include at least one colored resin layer. For example, the at least one colored resin layer includes colored resin layers of three different colors.

In one embodiment, the plurality of resin layers include a resin layer formed on the at least one colored layer. As the resin layer formed on the at least one colored layer, a transparent resin layer may be used.

In one embodiment, the plurality of columnar spacing structures further include a transparent conductive layer formed between the resin layer formed on the at least one colored layer and the at least one colored layer.

In one embodiment, the liquid crystal display device further comprises a black matrix, wherein the plurality of columnar spacing structures are formed on the black matrix.

In one embodiment, the liquid crystal display device comprises a plurality of further columnar spacing structures in a peripheral region surrounding the display region, wherein a spring modulus Kpt' per unit area of peripheral region satisfies the relationship 0.5×Kpt≦Kpt'<Kpt, the spring modulus Kpt' being defined as k×n'/S', where S' is an area of the peripheral region; and n' is a number of further columnar spacing structures in the peripheral region.

In one embodiment, the liquid crystal display device comprises a plurality of further columnar spacing structures in a peripheral region surrounding the display region, wherein, each of the plurality of columnar spacing structures includes a plurality of resin layers; and each of the plurality of further columnar spacing structures lacks at least one of the plurality of resin layers included in each of the plurality of columnar spacing structures.

In one embodiment, the liquid crystal layer is of a vertical orientation type; and a cell gap in a peripheral region surrounding the display region is in a range from −0.3 μm to +0.1 μm with respect to a cell gap in the display region.

In one embodiment, the liquid crystal display device further comprises, in a peripheral region surrounding the display region, a seal for allowing the pair of substrates to adhere to each other, the seal containing spacers.

In one embodiment, the liquid crystal display device further comprises, in a peripheral region surrounding the display region, a seal for allowing the pair of substrates to adhere to each other, the seal containing no spacers.

In one embodiment, at least a portion of the peripheral region surrounding the display region has a width of 6 mm or more.

A substrate to be used in the liquid crystal display device according to the present invention comprises the plurality of columnar spacing structures.

A method of producing a substrate for a liquid crystal display device according to the present invention comprises the steps of: providing a sample substrate; forming a columnar spacing structure sample on the sample substrate, the columnar spacing structure having at least one resin layer; determining a spring modulus $k_0$(mN/μm) of the columnar spacing structure sample and a cross-sectional area $Sps_0$ of a smallest portion of the columnar spacing structure sample, and calculating a spring modulus $Kps(=k_0/Sps_0)$ of the columnar spacing structure sample per unit area; and, with respect to an area S of a display region of the liquid crystal display device, a cross-sectional area Sps of a smallest portion of a columnar spacing structure to be formed on the substrate for the liquid crystal display device, and a number n of columnar spacing structures in the display region, prescribing the number n of columnar spacing structures and the cross-sectional area Sps of the smallest portion so that a spring modulus Kpt per unit area of display region, defined as Kps×(Sps×n/S), is within a range of no less than 0.00008 mN/μm$^3$ and no more than 0.00237 mN/μm$^3$.

In one embodiment, the method further comprises the steps of: providing a substrate; and forming the plurality of columnar spacing structures on the substrate, comprising forming n columnar spacing structures by using a same material as that of the columnar spacing structure sample, the smallest portion of each of the n columnar spacing structures having the prescribed cross-sectional area Sps.

According to the present invention, the configuration and distribution density of the columnar spacers can be optimized more easily than conventionally. This makes it possible to produce, more efficiently than conventionally: a liquid crystal display device in which "low-temperature voids", "lower bulging", and "pressure-induced unevenness" are suppressed, and which can provide a good display quality with little unevenness in luminance; and a substrate for use in such a liquid crystal display device.

In particular, in a configuration where a resin layer is included as an underlying layer of the columnar spacers, or where an opposing substrate to the substrate having the columnar spacers thereon has a resin layer on itself, a preferable configuration and distribution density of the columnar spacers can be determined without the repetitious trial-and-error efforts required in the conventional case. Therefore, the development timeline for the liquid crystal display device can be shortened, and the production cost for the liquid crystal display device can reduced, among other advantages.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, a liquid crystal display device according to an embodiment of the present invention and a method for producing the same will be described with reference to the accompanying drawings. Since the method for producing a liquid crystal display device according to an embodiment of the present invention is mainly characterized by the optimization of the configuration and distribution density of columnar spacers, the configuration and distribution density of the columnar spacers will be described first.

By using various materials as described later, the inventors have conducted studies on preferable configurations and distribution densities of the columnar spacers, thus finding that, in order to suppress "low-temperature voids", "lower bulging", and "pressure-induced unevenness", it is necessary for the liquid crystal display device (liquid crystal panel) to have preferable deformation characteristics. The inventors have also found that the deformation characteristics of a liquid crystal display panel are chiefly governed by the deformation characteristics of the individual columnar spacers as well as the distribution density of the columnar spacers. This means that merely optimizing the distribution density of the columnar spacers as described in Japanese Laid-Open Patent Publication Nos. 9-73088, 11-2718, and 2001-117103, supra, will not always guarantee a preferable liquid crystal display panel. Moreover, independently prescribing a preferable range for each of the distribution density and the hardness of the columnar spacers, as described in Japanese Laid-Open Patent Publication No. 2000-321580, supra, will not always guarantee a preferable liquid crystal display device.

Accordingly, the inventors have realized that the deformation characteristics of a preferable liquid crystal display panel can be expressed in terms of a spring modulus (hereinafter "Kpt") per unit area of the liquid crystal display panel (or mainly, a display region thereof), and that the spring modulus Kpt per unit area of the liquid crystal display panel can be expressed as a function of a spring modulus k of each columnar spacer and an distribution density (column area ratio P) of the columnar spacers. Note that, when considering the spring modulus k of each individual columnar spacer, it does not suffice to pay attention only to the characteristics of the columnar spacers themselves which have been formed by using a photosensitive resin, but it is also necessary to pay attention to the characteristics of any underlying resin layer of the columnar spacers, and any resin layer which may be present on an opposing substrate. Therefore, any such elements to be collectively involved in the consideration of "the spring modulus k of each columnar spacer", including the columnar spacer itself, will be referred to as a "columnar spacing structure".

In other words, a "columnar spacing structure" is a structural body which is present between a pair of substrates opposing each other with a liquid crystal layer interposed therebetween, the structural body including not only a columnar spacer formed from a photosensitive resin, but also any underlying resin layer, and any resin layer which may be present on the opposing substrate. Although gate lines, a gate insulating film (inorganic oxide film), and like elements are usually provided on a glass substrate, each such element has a very large spring modulus (as large as that of the substrate), and is thin. Therefore, these elements are considered as hardly contributive to the deformation of the display panel, and thus are ignored. Accordingly, in the present specification, a "columnar spacing structure" will refer to any structural elements present between the pair of opposing substrates, including a columnar spacer formed from a photosensitive resin and any resin layer (e.g., a color filter layer, a black matrix layer, and a resin interlayer insulating layer provided as an underlayer of pixel electrodes), as well as any intervening inorganic layer (e.g., a pixel electrode composed of an ITO layer).

Referring to FIGS. 1A to 1F, an exemplary configuration of a columnar spacing structure of a liquid crystal display device according to an embodiment of the present invention will be described.

Figure 1A:
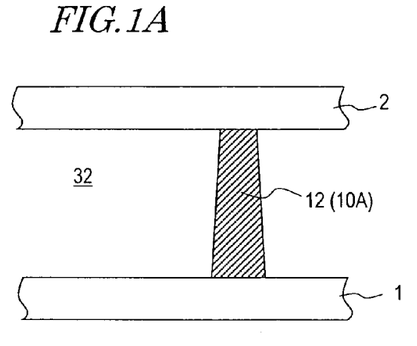
FIGS. 1A, 1B, 1C, 1D, 1E, and 1F are schematic diagrams illustrating an exemplary configuration of a columnar spacing structure of a liquid crystal display device according to an embodiment of the present invention.

The liquid crystal display device shown in FIG. 1A includes columnar spacers 12 (only one such spacer is shown in FIGS. 1A to 1F) which are formed between substrates 1 and 2 (e.g., glass). The columnar spacers 12 are composed of a photosensitive resin. A liquid crystal layer 32 is provided in a space defined by the columnar spacers 12. Each columnar spacer 12 is formed on the substrate 1 so as to have a forward taper, for example. Between each columnar spacer 12 and the substrate 1, and between each columnar spacer 12 and the substrate 2, there exits no layer which has such a small spring modulus as to affect the panel deformation. In other words, only the columnar spacers 12 contribute to the panel deformation. Therefore, in the case where the display device has a structure which can be approximated by the configuration shown in FIG. 1A, each columnar spacer 12 itself is the columnar spacing structure 10A.

Figure 1B:
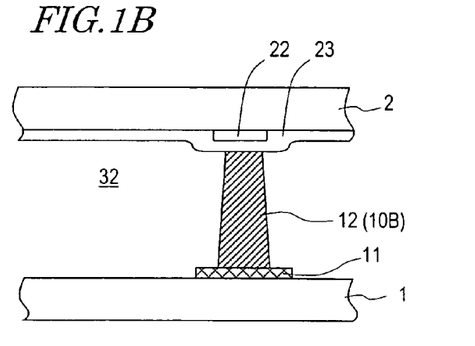

For example, as shown in FIG. 1B, even if a black matrix 11 formed of a metal film exists between the substrate 1 and each columnar spacer 12, or a bus line 22 and an inorganic insulating film 23 covering the bus line 22 are formed between the substrate 2 and each columnar spacer 12, such additional elements have a large spring modulus and a small film thickness, and therefore do not contribute to panel deformation. Therefore, in the configuration shown in FIG. 1B, each columnar spacer 12 itself is the columnar spacing structure 10B. In other words, the configuration shown in FIG. 1B can be regarded as equivalent to the configuration shown in FIG. 1A.

Figure 1C:
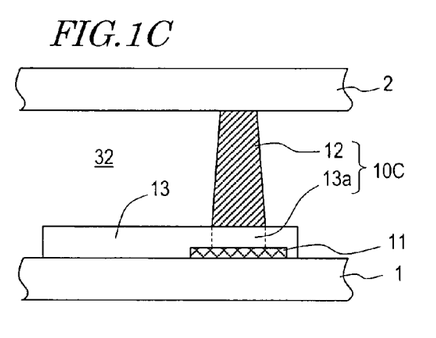

On the other hand, in the liquid crystal display device shown in FIG. 1C, a colored layer 13 for composing color filters is formed on a black matrix (composed of a metal film) which is formed on the substrate 1, such that the columnar spacers 12 are formed upon the colored layer 13. The black matrix 11 does not contribute to panel deformation. However, the colored layer 13 is generally composed of a photosensitive resin which contains dye or pigment, and therefore does contribute to panel deformation. Therefore, in the configuration shown in FIG. 1C, not only each columnar spacer 12 but also a portion 13a of the colored layer 13 existing between the columnar spacer 12 and the black matrix 11 is a part of the columnar spacing structure 10C.

Figure 1D:
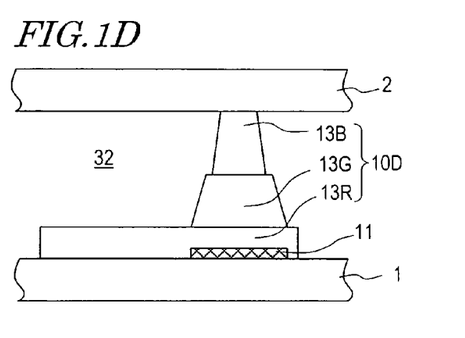

In the case where a photosensitive resin layer is used as a colored layer, as shown in FIG. 1D, a plurality of colored layers 13R, 13G, and 13B (e.g., three layers of red, green, and blue) may be stacked on one another to construct each columnar spacing structure 10D. By adopting such a configuration, the production process can be simplified. It will be appreciated that the colored layers to be stacked are not limited to three layers of red, green, and blue, but a combination of layers of any other colors may also be used. Moreover, the columnar spacers 12 to be used in the columnar spacing structures in any of FIGS. 1A to 1F may double as structural bodies for controlling the orientation of liquid crystal molecules. Such structural bodies for controlling liquid crystal molecule orientation are mainly used in an MVA technique, and are typically composed of a resin layer. In the case where the columnar spacers 12 double as structural bodies for controlling liquid crystal molecule orientation, a cost advantage is obtained because it is possible to form the columnar spacing structures without increasing the number of process steps. As the resin layer, a transparent resin layer may be used.

Figure 1E:
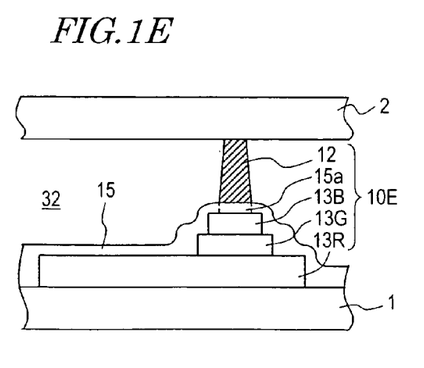

Moreover, as shown in FIG. 1E, each columnar spacer 12 may be formed (from a photosensitive resin) on a stacked structure of colored layers 13R, 13G, and 13B, thus forming a columnar spacing structure 10E including the colored layers 13R, 13G, and 13B as well as the columnar spacer 12. In this case, if a transparent conductive layer (e.g. an ITO layer) 15 to become a counter electrode is to be further formed, the transparent conductive layer (e.g. a counter electrode) 15 may be formed after forming the stacked structure of colored layers 13R, 13G, and 13B, and each columnar spacer 12 may be formed upon the transparent conductive layer 15. When such a process is adopted, each columnar spacing structure 10E will include a portion 15a of the transparent conductive film 15 interposed between the columnar spacer 12 and the stacked structure of colored layers 13R, 13G, and 13B. Since the transparent conductive film 15 will not affect the spring modulus of the columnar spacing structures 10E for the reason described above, it is possible to omit the transparent conductive film 15 when tentatively producing columnar spacing structure samples in order to ascertain the spring modulus of each columnar spacing structure per unit area as will be described later.

Figure 1F:
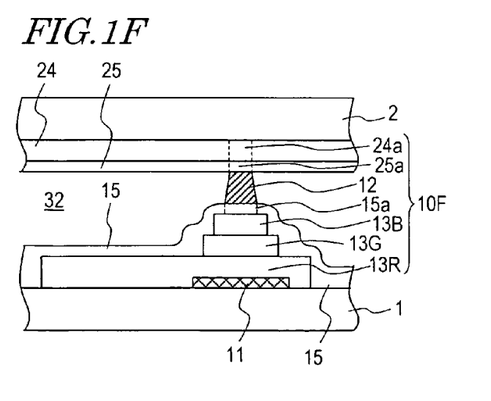

Moreover, as shown in FIG. 1F, the substrate 2 lying opposite to the substrate 1 which has the columnar spacers 12 formed thereon may include a resin layer 24. In this case, each columnar spacing structure 10F includes a stacked structure of colored layers 13R, 13G, and 13B, a columnar spacer 12 formed thereupon, and a portion 24a of the resin layer 24 existing between the columnar spacer 12 and the substrate 2. The resin layer 24 is e.g. an interlayer insulating film 24 for insulating each pixel electrode 25 from underlying wiring or the like; by adopting such a configuration, it becomes possible to increase the pixel aperture ratio. Thus, the columnar spacing structure 10F shown in FIG. 1F may typically include the stacked structure of colored layers 13R, 13G, and 13B, the columnar spacer 12, the interlayer insulating film 24, as well as an intervening portion 15a of a transparent conductive layer 15 and an intervening portion 25a of the pixel electrode 25. In this case, too, it is possible to omit the transparent conductive film 15 and/or the pixel electrodes 25 when tentatively producing columnar spacing structure samples, as mentioned above. However, the interlayer insulating film 24 is not negligible. Therefore, when producing columnar spacing structure samples, it would be preferable that the transparent conductive film 15 and the pixel electrode 25 be omitted from each columnar spacing structure 10F, and ascertain the spring modulus of the structure columnar spacing structures as such. Alternatively, the spring modulus of columnar spacing structure samples each composed of a stacked structure of colored layers 13R, 13G, and 13B and a columnar spacer 12 may be ascertained separately from the spring modulus of the interlayer insulating film 24, and the spring modulus of the entire columnar spacing structure 10F may be determined through calculation.

The columnar spacing structure according to an embodiment of the present invention is not limited to the above examples, but various combinations thereof may also be possible. Moreover, the layers composing each columnar spacing structure are not limited to those exemplified in FIGS. 1A to 1F. For example, the black matrix may be formed of a photosensitive resin layer of a black color. In this case, unlike in the aforementioned case where the black matrix is formed of a metal layer, the black matrix (photosensitive resin layer of a black color) will also contribute to panel deformation. Furthermore, although the columnar spacer 12 in FIGS. 1E and 1F is illustrated as being smaller than e.g. the colored layer 13B and 13G which are present below the transparent conductive film 15, it would also be possible to form each columnar spacer 12 so as to be large enough to cover the colored layers 13B and 13G, whereby leakage between the upper and lower electrodes due to the presence of any conductive foreign matter will be reduced.

Although the columnar spacing structures 10A to 10F are preferably formed outside the pixels from the perspective of improving the aperture ratio, each columnar spacing structural body may alternatively be formed within a pixel, if necessary. Moreover, it is preferable that the columnar spacing structures be uniformly distributed over the display region (i.e., a region in which display is to be performed based on a matrix arrangement of pixels), such that the number of columnar spacing structures in the display region and the number of pixels (dots) constitute an integer ratio.

Next, a method for optimizing the distribution density of columnar spacing structures according to an embodiment of the present invention will be described.

According to the present invention, the deformation characteristics of a liquid crystal display panel are expressed in terms of a spring modulus ("Kpt") per unit area of the liquid crystal display panel, and the spring modulus Kpt per unit area of the liquid crystal display panel is expressed as a function of a spring modulus k of each columnar spacing structure and an distribution density of the columnar spacing structures. Herein, the distribution density in the display region of the liquid crystal display panel will be described. The distribution density of the columnar spacing structures is represented as a ratio P (area ratio accounted for by the columnar spacing structures; simply referred to as "column area ratio") of the area Sps of all columnar spacing structures to the area S of the display region.

Figure 2A:
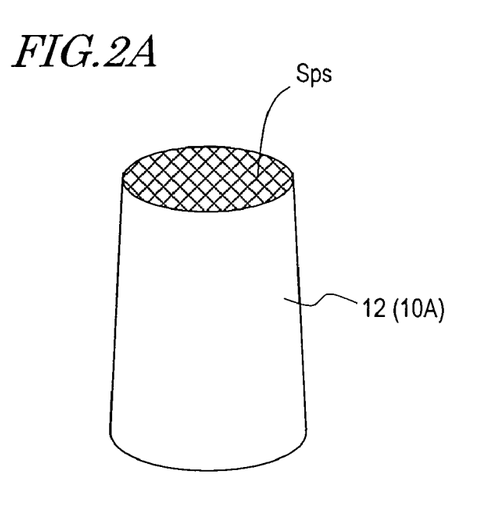
FIGS. 2A, 2B, and 2C are schematic illustrations of an exemplary configuration of a columnar spacing structure of a liquid crystal display device according to an embodiment of the present invention.
Figure 2B:
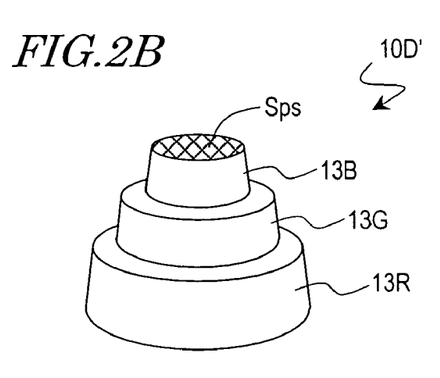
Figure 2C:
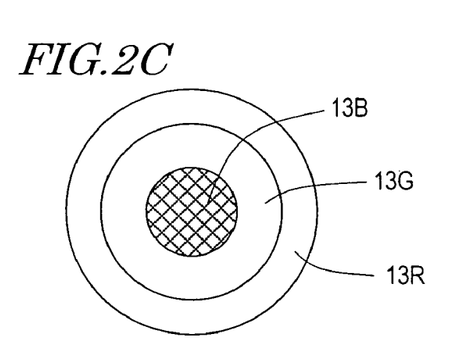

In general, each columnar spacing structure has a tapered shape, as exemplified by the columnar spacing structures 10A and 10D' schematically shown in FIGS. 2A, 2B, and 2C. Therefore, the area of each columnar spacing structure, as taken in the plane of the display panel, will be represented by the area of a smallest portion of the columnar spacing structure, i.e., a portion having the smallest cross-sectional area on a plane which is parallel to the display panel. Hereinafter, a mere reference to a "cross-sectional area" will be based on the same definition. Accordingly, assuming that there is a total of n columnar spacing structures in the display region, the area ratio (column area ratio) P of the columnar spacing structures is expressed as P=Sps×n/S.

The spring modulus k of a single columnar spacing structure may be ascertained by measuring a compression displacement in response to a compression load by using e.g. a micro-displacement measurement device, based on k=(compression load)/(compression displacement).

From the spring modulus k of a single columnar spacing structure and the cross-sectional area Sps of the smallest portion of each columnar spacing structure, the spring modulus Kps (=k/Sps) of each columnar spacing structure per unit area is obtained. By using this value, the spring modulus per unit area of display region is defined as Kpt=Kps×P. The relationship between these parameters is summarized in Table 1 below.

TABLE 1

| parameters | expression | unit |
| --- | --- | --- |
| Cross-sectional area of smallest portion of each CSS | Sps | $\mu m^2$ |
| Area of display region | S | $\mu m^2$ |
| Number of CSSs in display region | n | — |
| Area ratio of CSSs | P = Sps × n/S | — |
| Spring modulus of each CSS | k | $mN/\mu m$ |
| Spring modulus of CSS per unit area | Kps = k/Sps | $mN/\mu m^3$ |
| Spring modulus per unit area of display region | Kpt = Kps × P | $mN/\mu m^3$ |

CSS: columnar spacing structure

Now, the above parameters will be individually discussed to explain which one(s) of them allows for and needs adjustment depending on each liquid crystal display panel design. Firstly, the area S of the display region is specific to each liquid crystal display panel, and is therefore subject to the design of the liquid crystal panel to be produced. The configuration of each columnar spacing structure (which may be chosen from e.g. those shown in FIGS. 1A to 1F) will depend on the design of the liquid crystal display panel and the particular production process used. The materials of the colored layers composing the color filter (if any) and the black matrix (if any) are to be selected based on the characteristics required of these respective elements. As for the photosensitive resin for composing the columnar spacers, there may be some room for consideration in the case where each columnar spacing structure includes a columnar spacer as a discrete entity in addition to a colored layer and the like. The remaining parameters are the number n of columnar spacing structures in the display region and the cross-sectional area Sps of the smallest portion of each columnar spacing structure.

In practice, the columnar spacers are likely to be formed from the same photosensitive resin that is being used in another process which is part of the whole production process. Therefore, most likely, the only parameters which are left to be optimized when designing a new model of a liquid crystal display device are: the number n of columnar spacing structures in the display region; and the cross-sectional area Sps of the smallest portion of each columnar spacing structure.

Now, the spring modulus Kps of each columnar spacing structure per unit area is specific to the configuration of each columnar spacing structure, and does not depend on the cross-sectional area Sps of the smallest portion. Since Kps is thus given, it suffices to prescribe the cross-sectional area Sps of the smallest portion and the number n so that the spring modulus Kpt per unit area of display region falls within a preferable range for obtaining an optimum liquid crystal display panel. The inventors have confirmed the efficacy of this designing scheme through various experiments.

Specifically, as will be described later with reference to experimental examples, the earlier-described problems (in particular "lower bulging") are prevented so long as the spring modulus Kpt per unit area of the liquid crystal display panel (display region) is within the range of no less than $0.00008\ mN/\mu m^3$ and no more than $0.00237\ mN/\mu m^3$. Thus, based on the spring modulus Kps of each columnar spacing structure per unit area as determined using columnar spacing structure samples, an optimum liquid crystal display panel can be produced by prescribing the cross-sectional area Sps of the smallest portion and the number n so that the spring modulus Kpt falls within the aforementioned range. In this manner, excessive trial-and-error efforts are avoided, and a sufficient process margin can be provided against fluctuations (of injection time, etc.) during the panel assembling process.

Figure 3:
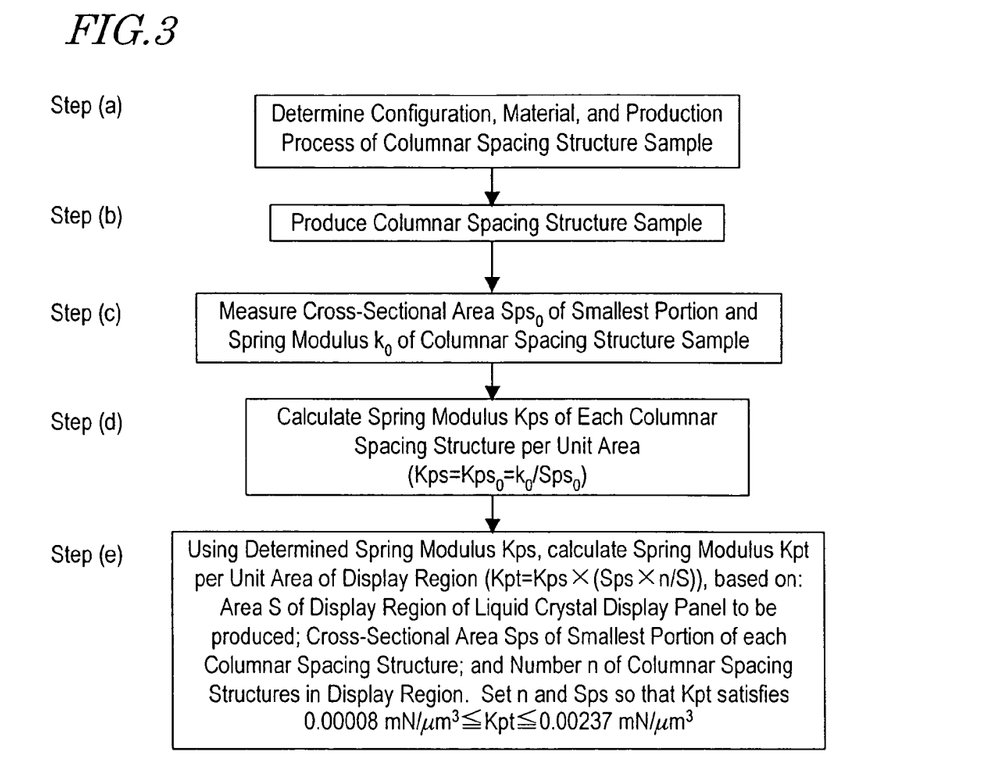
FIG. 3 is a flowchart illustrating a method for optimizing the distribution density of the columnar spacing structures according to an embodiment of the present invention.

Hereinafter, a method for optimizing the distribution density of the columnar spacing structures according to an embodiment of the present invention will be described with reference to FIG. 3.

First, in accordance with the liquid crystal display panel to be produced, the configuration, material, and production process of the columnar spacing structure sample are determined (step (a)). As used herein, the "columnar spacing structure samples" are samples to be used for ascertaining the spring modulus of each columnar spacing structure, and do not need to be the columnar spacing structures to be employed in an actual liquid crystal display device. However, as described above, each columnar spacing structure may include not only a columnar spacer but also an underlying layer and/or a resin layer formed on an opposing substrate, and it is preferable that the columnar spacing structure samples are close to the actual columnar spacing structures as such. The spring modulus k of each columnar spacing structure can be calculated from the spring modulus $k_0$ of a plurality of columnar spacing structure samples, which are obtained by dividing an actual columnar spacing structure into a plurality of portions. In the following descriptions, any parameter whose value is ascertained with respect to columnar spacing structure samples will be distinguished by the suffix "$_0$".

Next, in accordance with the determinations made at step (a), columnar spacing structure samples are produced on a sample substrate (step (b)). This sample substrate does not need to be a substrate to be actually used in the liquid crystal display device, but may be a smaller substrate. Therefore, photomasks and any other elements used for producing the columnar spacing structure samples may also be smaller.

The spring modulus Kps of each columnar spacing structure per unit area does not depend on the cross-sectional area Sps of the smallest portion. However, there may be slight variations in the structure of each columnar spacing structure due to fluctuations in the production process and the like. Therefore, it is preferable to prescribe the cross-sectional area $Sps_0$ of the smallest portion of each columnar spacing structure sample to be a value which is close to the cross-sectional area Sps of the smallest portion of each actual columnar spacing structure, and it is preferable to produce a plurality of columnar spacing structure samples whose smallest portions exhibit different cross-sectional areas Sps. In the experimental examples described later, columnar spacing structure samples were produced such that the cross-sectional areas $Sps$ of the smallest portions thereof were in the range from about 60 μm² to about 1000 μm³. In an actual liquid crystal display device, if each columnar spacing structure is too large, the aperture ratio of the pixel would be lowered, or the liquid crystal molecule orientation in the pixel would be disturbed, thus degrading the display quality. Therefore, in an actual liquid crystal display device, it is preferable that the cross-sectional area $Sps$ of the smallest portion is as small as possible, granted that the columnar spacing structures can be formed with a good reproducibility. Although the dimensional accuracy of the columnar spacing structures would depend on the resolution of the photosensitive resin material, it is preferable that the cross-sectional area $Sps$ of the smallest portion of each columnar spacing structure is within a range from about 60 μm² to about 200 μm².

With respect to each columnar spacing structure sample thus produced, a cross-sectional area $Sps_0$ of the smallest portion and a spring modulus $k_0$ are measured. The cross-sectional area $Sps_0$ of the smallest portion can be determined from micrographs. The spring modulus $k_0$ can be determined by using e.g. a micro-displacement measurement device, and measuring a compression displacement with respect to a compression load, based on $k_0$=(compression load)/(compression displacement). In the experimental examples described below, a compression load of 30 mN was applied to each columnar spacing structure sample in a vertical direction. As used herein, the "compression displacement" refers to the total amount of displacement under a load, and includes elastic deformation and plastic deformation. In the experimental examples described later, each spacing structure sample had a restoration ratio (=elastic deformation/total displacement) of about 0.7. Therefore, when an "elastic spring modulus ($k^E_0$)" is defined as a spring modulus which is ascribable to the elastic deformation of each columnar spacing structure sample, it follows that $k^E_0=k_0/0.7$.

From the cross-sectional area $Sps_0$ of the smallest portion and spring modulus $k_0$ of the columnar spacing structure samples thus determined, the spring modulus $Kps$ of each columnar spacing structure per unit area is calculated (step (d)). Although the spring modulus $Kps_0(=k_0/Sps_0)$ is that of the columnar spacing structure samples, it can be presumed that $Kps_0=Kps$ so long as the columnar spacing structure samples are good imitations of the columnar spacing structures to be actually produced. Similarly, instead of employing the spring modulus $k_0$, an elastic spring modulus $k^E_0$ may be employed to determine an elastic spring modulus $K^Eps$ of each columnar spacing structure per unit area.

Next, by using the spring modulus $Kps$ thus determined, the spring modulus $Kpt$ per unit area of display region is calculated ($Kpt=Kps\times(Sps\times n/S)$), based on the area $S$ of the display region of the liquid crystal display panel to be produced, the cross-sectional area $Sps$ of the smallest portion of each columnar spacing structure, and the number $n$ of columnar spacing structures in the display region. Through this process, $n$ and $Sps$ are set so that $Kpt$ satisfies 0.00008 mN/μm³≦$Kpt$≦0.00237 mN/μm³ (step (e)). Similarly, instead of employing the spring modulus $Kps$, an elastic spring modulus $K^Eps$ may be employed to determine an elastic spring modulus $K^Ept$ per unit area of display region, and $n$ and $Sps$ may be set so that $K^Ept$ satisfies 0.00011 mN/μm³≦$K^Ept$≦0.00339 mN/p m³.

Then, a substrate for the liquid crystal display device is produced so as to satisfy the conditions which are prescribed in the aforementioned manner. Although the columnar spacing structures will typically be formed on a color filter substrate, the present invention is not limited thereto.

Hereinafter, with reference to experimental examples, the configuration and distribution density of the columnar spacing structures in a liquid crystal display device according to an embodiment of the present invention will be described in more detail. Any spring modulus $k_0$ which is discussed in the following descriptions is obtained based on a compression displacement which is the total amount of displacement under a load.

In this experimentation, columnar spacing structure samples having the configuration as shown in FIG. 1C were produced. The materials and film thicknesses of the layers were as follows: the columnar spacers 12 were produced by using acrylic resin, with a film thickness of 4 μm; the colored layer 13 was produced by using a pigment-dispersed type acrylic resin, with a film thickness of 2 μm. As the photosensitive resins for forming the columnar spacers 12, five kinds of materials (A, B, C, D, and E) were used. The resultant columnar spacing structures, including the columnar spacers 12 and being formed by using the photosensitive resins A, B, C, D, and E, will be referred to as columnar spacing structures A, B, C, D, and E, respectively.

The spring moduli $k_0$ of the columnar spacing structure samples A, B, C, D, and E were measured by using a micro-displacement measurement device (Shimadzu Corporation, DUH-201), with a compression load of 30 mN. Moreover, the cross-sectional area $Sps_0$ of the smallest portion of each sample was determined from micrographs. In the case where the smallest portion is at the apex of the columnar spacing structure, the area of any flat portion of the apex is to be regarded as the "cross-sectional area of the smallest portion". In the case where the apex is rounded in shape, it may be difficult to ascertain the cross-sectional area with a microscope. In such a case, a cross-sectional area as taken at a position corresponding to 90% of the height of the columnar spacing structure may be ascertained by using a 3D shape-measurement apparatus, for example, and the cross-sectional area of the smallest portion can be derived from this value. The spring moduli $Kps$ of the respective columnar spacing structure samples per unit area as determined from these measurement values were: 0.48 mN/μm³ (Sample A), 0.66 mN/μm³ (Sample B), 0.72 mN/μm³ (Sample C), 0.57 mN/μm³ (Sample D), and 2.40 mN/μm³ (Sample E).

Figure 4:
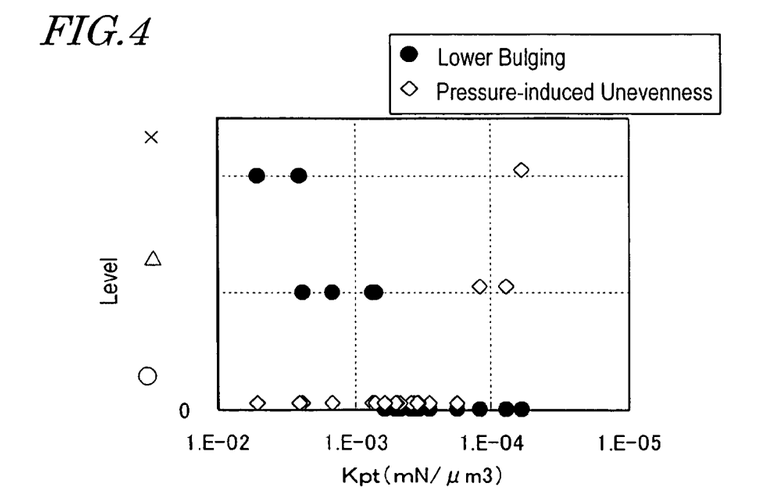
FIG. 4 is a graph illustrating the relationship between the spring modulus per unit area of display region and the occurrences of lower bulging and pressure-induced unevenness.

Based on these data, liquid crystal display panels which had different values of spring modulus per unit area of display region were produced by using the respective columnar spacing structures, and the presence/absence of low-temperature voids, lower bulging, and pressure-induced unevenness were evaluated. The results are shown in Table 2. FIG. 4 is a graphic representation of the results of Table 2.

The "lower bulging" was evaluated by visually inspecting the presence/absence of unevenness in luminance after leaving each liquid crystal display panel in a substantially vertical posture at a high temperature of about 60° C. for 24 hours. The "pressure-induced unevenness" was evaluated by visually inspecting the presence/absence of unevenness in luminance after, by using a push-pull gauge, holding a flat-ended pad (tip area: 78 cm²) perpendicularly against the panel surface for one minute so that load was applied with a pressure of 3 kgf/cm² via a cushioning rubber. The following readings were employed: (○) no unevenness is observed; (Δ) unevenness is observed with unaided eyes; and (×) unevenness is recognized even through a neutral-density filter (transmittance: 10%) for cameras. The "low-temperature voids" were evaluated in an environment kept at −30° C., based on the presence/absence of voids after leaving each liquid crystal display panel in such an environment for 500 hours.

TABLE 2

| Sample No. | Type of columnar spacer material | Spring modulus of each CSS k(mN/µm) | Cross-sectional area of smallest portion Sps(µm²) | Spring modulus of CSS per unit area Kps(mN/µm³) | Area of display region S(µm²) | Number of CSSs in display region n | Area ratio of CSSs P | Spring modulus per unit area of display region Kpt(mN/µm³) | Panel characteristics ||| 
|---|---|---|---|---|---|---|---|---|---|---|---|
| | | | | | | | | | Low-temperature voids | Lower bulging | Pressure-induced unevenness |
| 1 | A | 30.7 | 64 | 0.48 | 2.47E+11 | 491520 | 0.00013 | 0.000060 | ○ | ○ | X |
| 2 | ↑ | 30.7 | 64 | 0.48 | 1.20E+11 | 307200 | 0.00016 | 0.000077 | ○ | ○ | Δ |
| 3 | ↑ | 30.7 | 64 | 0.48 | 2.47E+11 | 983040 | 0.00025 | 0.000120 | ○ | ○ | Δ |
| 4 | ↑ | 30.7 | 64 | 0.48 | 5.27E+10 | 307200 | 0.00037 | 0.000178 | ○ | ○ | ○ |
| 5 | ↑ | 30.7 | 64 | 0.48 | 3.16E+11 | 2949120 | 0.00059 | 0.000283 | ○ | ○ | ○ |
| 6 | ↑ | 45.6 | 95 | 0.48 | 1.20E+11 | 921600 | 0.00073 | 0.000350 | ○ | ○ | ○ |
| 7 | ↑ | 30.7 | 64 | 0.48 | 6.94E+10 | 786432 | 0.00072 | 0.000346 | ○ | ○ | ○ |
| 8 | ↑ | 30.7 | 64 | 0.48 | 5.27E+10 | 614400 | 0.00074 | 0.000355 | ○ | ○ | ○ |
| 9 | ↑ | 30.7 | 64 | 0.48 | 2.47E+11 | 2949120 | 0.00076 | 0.000365 | ○ | ○ | ○ |
| 10 | ↑ | 30.7 | 64 | 0.48 | 1.03E+11 | 1310720 | 0.00081 | 0.000389 | ○ | ○ | ○ |
| 11 | ↑ | 30.7 | 64 | 0.48 | 1.25E+11 | 1920000 | 0.00098 | 0.000470 | ○ | ○ | ○ |
| 12 | ↑ | 30.7 | 64 | 0.48 | 8.06E+10 | 1310720 | 0.00103 | 0.000494 | ○ | ○ | ○ |
| 13 | ↑ | 30.7 | 64 | 0.48 | 1.16E+11 | 1920000 | 0.00105 | 0.000504 | ○ | ○ | ○ |
| 14 | ↑ | 64.8 | 135 | 0.48 | 6.94E+10 | 786432 | 0.00153 | 0.000734 | ○ | Δ | ○ |
| 15 | ↑ | 129.6 | 270 | 0.48 | 6.94E+10 | 786432 | 0.00307 | 0.00147 | ○ | Δ | ○ |
| 16 | ↑ | 208.8 | 435 | 0.48 | 6.94E+10 | 786432 | 0.00493 | 0.00237 | ○ | Δ | ○ |
| 17 | ↑ | 483.8 | 1008 | 0.48 | 4.99E+10 | 528000 | 0.01066 | 0.00512 | X | X | ○ |
| 18 | B | 65.3 | 99 | 0.66 | 6.94E+10 | 786432 | 0.00112 | 0.000739 | ○ | Δ | ○ |
| 19 | C | 46.1 | 64 | 0.72 | 6.39E+10 | 245760 | 0.00025 | 0.000180 | ○ | ○ | ○ |
| 20 | ↑ | 46.1 | 64 | 0.72 | 6.39E+10 | 491520 | 0.00049 | 0.000353 | ○ | ○ | ○ |
| 21 | ↑ | 46.1 | 64 | 0.72 | 6.39E+10 | 983040 | 0.00098 | 0.000706 | ○ | Δ | ○ |
| 22 | D | 36.5 | 64 | 0.57 | 1.16E+11 | 1920000 | 0.00105 | 0.000603 | ○ | ○ | ○ |
| 23 | E | 153.6 | 64 | 2.40 | 1.16E+11 | 1920000 | 0.00105 | 0.00254 | ○ | X | ○ |

As can be seen from the results shown in Table 2 and FIG. 4, there is a definite correlation between pressure-induced unevenness and lower bulging problems and the spring modulus Kpt per unit area of display region, irrespective of the material and cross-sectional area of the smallest portion of each columnar spacing structure sample.

It will be seen that a sufficient mechanical strength is obtained and pressure-induced unevenness is suppressed so long as the spring modulus Kpt per unit area of display region is equal to or greater than $0.000077(\approx 0.00008)$, and that lower bulging is suppressed so long as the spring modulus Kpt per unit area of display region is equal to or less than $0.00237$ mN/µm³. Thus, the preferable range of the spring modulus Kpt per unit area of display region is considered to be no less than $0.00008$ mN/µm³ and no more than $0.00237$ mN/µm³. In order to further reduce pressure-induced unevenness, it is preferable that the spring modulus Kpt per unit area of display region is equal to or greater than $0.000178(\approx 0.00018)$ mN/µm³. In order to further reduce lower bulging, it is preferable that the spring modulus Kpt per unit area of display region is equal to or less than $0.000504(\approx 0.0005)$ mN/µm³. Note that, no low-temperature voids were observed in the aforementioned ranges of spring modulus Kpt per unit area of display region (i.e., no less than $0.00008$ mN/µm³ and no more than $0.00237$ mN/µm³).

When Sample No. 11 (column material A) and Sample No. 21 (column material C) in Table 2 are compared, it will be seen that Sample No. 11 has no lower bulging but Sample No. 21 has some lower bulging, although both Samples have the same column area ratio P of 0.00098. Similarly, between Sample No. 3 and Sample No. 19 which have the same column area ratio P of 0.00025, Sample No. 3 is more susceptible to pressure-induced unevenness than Sample No. 19.

Such results are not mere evaluational fluctuations, but indicate the fact that the evaluation of the column area ratio P should not be made separately from the evaluation of the deformation characteristics (elasticity characteristics) of the columnar spacing structures, and vice versa. In other words, although the conditions which are found optimum based on the column area ratio P may be valid for the case of employing a particular type of material, but such conditions may no longer be preferable in the case where the columnar spacing structures have different deformation characteristics. This principle is true not only of the type of column material but also other factors. As described above, the spring modulus (deformation characteristics) of the columnar spacing structures is susceptible not only to the material of the columnar spacers but also to the underlying layers and the like. Therefore, even if columnar spacers of the same material are used, preferable conditions may not be attained when columnar spacing structures of a different configuration are employed.

When injecting a liquid crystal material into the gap of a liquid crystal cell which is obtained by attaching a substrate bearing the columnar spacing structures prescribed as above (e.g., an opposing substrate) to another substrate (e.g. a TFT substrate), it is preferable that the pressure of the liquid crystal material be maintained slightly lower than the atmospheric pressure. By selecting such a pressure, the lower bulging problem can be more effectively suppressed. In particular, the cell gap tends to increase due to the thermal expansion of the liquid crystal material near the higher temperature limit of the temperature range in which the liquid crystal display device is used. If the columnar spacers fail to conform to the changing cell gap, interspaces will emerge between the opposing substrate and the upper portions of the columnar spacers, thus causing lower bulging. Therefore, it is preferable to keep the columnar spacing structures compressed so as to able to conform to the thermal expansion of the liquid crystal material. However, if the columnar spacing structures are excessively compressed, an elastic rebound force associated with the columnar spacers becomes too large, thus lowering the pressure of the liquid crystal material and creating a negative pressure. As a result, the liquid crystal display device will become liable to low-temperature voids. The upper limit value of the spring modulus Kpt per unit area of display region concerns how much of such compression margin can be allowed.

According to the experiments by the inventors, so long as the spring modulus Kpt per unit area of display region falls within the aforementioned range of no less than 0.00008 mN/µm$^3$ and no more than 0.0005 mN/µm$^3$, a sufficiently large margin can be obtained against lower bulging due to gravity acting on the liquid crystal material, which is relatively likely to occur in large-size liquid crystal display panels (e.g. 20 inches or more).

The actual production process will suffer from fluctuations in various process factors. Therefore, it is preferable that the spring modulus Kpt per unit area of display region be prescribed near the median of the range of no less than 0.00018 mN/µm$^3$ and no more than 0.0005 mN/µm$^3$ (e.g., so as to be no less than 0.0003 mN/µm$^3$ and no more than 0.0004 mN/µm$^3$).

Furthermore, columnar spacing structures having the configuration as shown in FIG. 1D were produced, and the panel characteristics were evaluated by a similar method. For example, columnar spacing structures each of whose smallest portion had a cross-sectional area Sps of 135 µm$^2$ were produced, by employing acrylic resin layers as the colored resin layers 13R, 13B, and 13 G. The spring modulus Kps of each such columnar spacing structure (sample) per unit area was 0.48 mN/µm$^3$ (i.e., equal to that of type A columns). Moreover, a liquid crystal display panel with an interlayer insulating film 24 was produced so that the spring modulus Kpt per unit area of display region was 0.000367 mN/µm$^3$. This panel was also subjected to an evaluation, which revealed none of the aforementioned problems. Thus, even if the spring modulus of each individual resin layer is unknown, an optimum liquid crystal display panel can be designed so long as the spring modulus of the entire columnar spacing structure is known; this is another advantageous feature of the designing methodology according to an embodiment of the present invention.

The description of the above embodiment concerns the density of the columnar spacing structures which are disposed in the display region of the liquid crystal display panel. Rather than being limited thereto, the designing methodology for the configuration and distribution density of the columnar spacing structures is also applicable to the peripheral region (also called "frame region") surrounding the display region. The configurations of the underlying layer of the columnar spacers and the opposing substrate may differ between the display region and the peripheral region. For example, in the case of a TFT-type liquid crystal display device, more wiring, etc., to be connected to terminals may be present in the peripheral region than in the display region (in terms of area ratio), and a black matrix (BM) may be present in the peripheral region. In such cases, the configuration of the columnar spacing structures may differ between the display region and the peripheral region. Under these conditions, it would be preferable to employ the aforementioned designing scheme to optimize the configuration and distribution density of the columnar spacing structures with respect to not only the display region but also the peripheral region, as will be appreciated.

However again, because of the presence of wiring and the like to be connected to terminals and a black matrix (BM) in the peripheral region of a TFT-type liquid crystal display device, producing columnar spacing structures in the peripheral region by using a process similar to that which is applied to the display region may generally result in the columnar spacing structures in the peripheral region being too high. In this regard, it might not be necessary to adjust the configuration of the columnar spacing structures in the peripheral region in a manner similar to the columnar spacing structures in the display region. Rather, the value of a spring modulus Kpt' per unit area of peripheral region (which is defined as k×n'/S', where S' is the area of the peripheral region; and n' is the number of columnar spacing structures in the peripheral region) may be controlled so as to be smaller than the spring modulus Kpt per unit area of display region and equal to or greater than ½×Kpt.

By prescribing the spring modulus per unit area of peripheral region in the above manner, the columnar spacing structures disposed in the peripheral region will experience a slightly greater deformation than the columnar spacing structures disposed in the display region. This results in an improved uniformity between the cell gap in the display region and the cell gap in the peripheral region.

Figure 5:
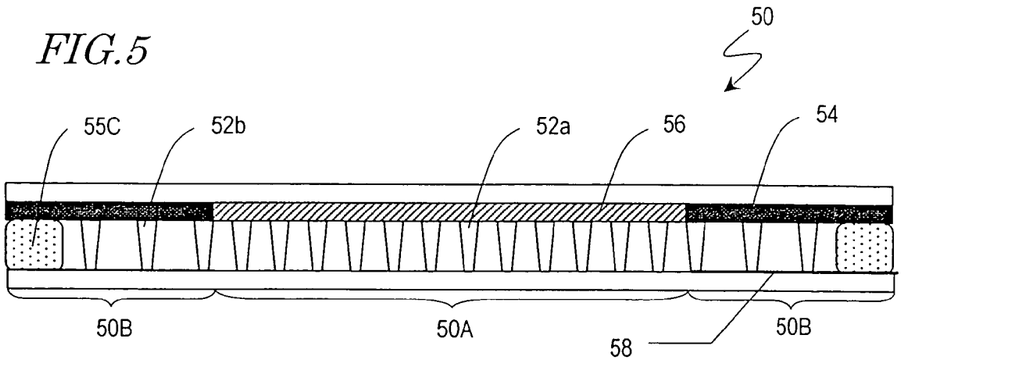
FIG. 5 is a schematic diagram illustrating an distribution density of the columnar spacing structures of a liquid crystal display panel 50 according to an embodiment of the present invention.

For example, as in the liquid crystal display panel 50 schematically shown in FIG. 5, based on columnar spacing structures 52a which are disposed in a display region 50A (in which color filters 56 are provided), columnar spacing structures 52b in a peripheral region 50B (in which a black matrix 54 and wiring 58 are provided) may be disposed in such a manner that the column area ratio in the peripheral region is ½ of the column area ratio in the display region. By thus prescribing such column area ratios, if columnar spacing structures having the same spring modulus per unit area are formed as the columnar spacing structures 52a and the columnar spacing structures 52b, the value of the spring modulus Kpt per unit area in the peripheral region will be half the value in the display region. As a result, the difference between the gap in the peripheral region and the gap in the display region can be absorbed by the deformation of the columnar spacing structures 52b. The columnar spacing structures of Sample No. 9, 11, or 22 shown in Table 2 were arranged in such a manner that the column area ratio in the peripheral region was ½ of the column area ratio in the display region, whereby a gap difference of about 0.1 µm to 0.15 µm was successfully absorbed. Even without allowing spherical or fibrous spacers for attaining a uniform cell gap to be contained in a seal 55C which is to be provided in the peripheral region for effecting substrate adhesion, no unevenness in luminance was observed in any portion of the display region near the peripheral region.

The spacers to be contained in the seal (hereinafter referred to as "intra-seal spacers") are provided primarily for the purpose of attaining a uniform cell gap, and therefore the size of the spacers must be optimized with respect to a given cell gap. One advantage of the above design is that it permits the use of spacers whose size is less than the optimum value. In other words, it becomes possible to commonly apply the same intra-seal spacers to a plurality of models of liquid crystal panels, thus alleviating the need to adapt the seal application process to each model of liquid crystal panel.

In the below-described example where spacers for attaining a uniform cell gap do not need to be contained in the seal, intra-seal spacers whose size is less than the optimum value may be used.

It will be appreciated that, instead of or in addition to varying the column area ratio, columnar spacing structures 52b having a different spring modulus from that of the columnar spacing structures 52a in the display region may be formed. In either case, by prescribing the spring modulus per unit area of peripheral region to be smaller than the spring modulus per unit area of display region, the cell gap in the peripheral region is being set on the basis of the cell gap in the display region.

It will be appreciated that, in the case where the cell gap is the same between the display region and the peripheral region, it is not necessary to change the spring modulus per unit area between the display region and the peripheral region. Instead, the spring modulus in the display region and the peripheral region may be prescribed equal to Kpt. In such a case, it is unnecessary to include spherical or fibrous spacers (for attaining a uniform cell gap) in the seal 55C to be provided in the peripheral region for effecting substrate adhesion. Note that, as compared to the display region, the peripheral region has a high wiring density, and/or the light shielding portions of the black matrix have a large area in the peripheral region. For these and other reasons, upon resin application, a greater resin thickness may result in the peripheral region than in the display region. In such cases, uniformity between the cell gap in the display region and the cell gap in the peripheral region may be lost if each columnar spacing structure in the peripheral region has the same layer configuration as that of each columnar spacing structure in the display region. As described above, by prescribing the column area ratio in the peripheral region to be smaller than the column area ratio in the display region, e.g., ½, a difference in thickness on the order of 0.1 µm to 0.15 µm can be absorbed.

Alternatively, the number of resin layers composing each columnar spacing structure 52b in the peripheral region may be fewer than the number of resin layers composing each columnar spacing structure 52a in the display region, so that the columnar spacing structures 52b and the columnar spacing structures 52a are substantially equalized in height. For example, in the case where each columnar spacing structure 52a in the display region as shown in FIG. 5 has a structure as shown in FIG. 1F, each columnar spacing structure 52b in the peripheral region may have a structure based on the structure of FIG. 1F except that the colored layer 13G is omitted therefrom. Alternatively, each columnar spacing structure 52b in the peripheral region may have a structure based on the structure of FIG. 1F except that insulating film 24a or the electrode 25a on the opposing substrate is omitted therefrom. In other words, referring to FIG. 5, it may be ensured that a total of [height of each columnar spacing structure 52a in the display region]+[any film thickness on the substrate at the position where the columnar spacing structure 52a is disposed]+[any film thickness on the opposing substrate] is substantially equal to a total of [height of each columnar spacing structure 52b in the peripheral region]+[any film thickness on the substrate at the position where the columnar spacing structure 52b is disposed]+[any film thickness on the opposing substrate]. In this case, the column area ratio in the peripheral region may be made equal to the column area ratio in the display region. Alternatively, the column area ratio in the peripheral region may be smaller than the column area ratio in the display region as described above.

In the case where a seal not containing any spacers is used, a particularly useful effect is obtained when a width of the peripheral region 50B (i.e., distance from the outer boundary of the display region to the outer boundary of the seal) is 6 mm or more. Note that the width of the peripheral region 50B may not necessarily be constant with regard to all of the four sides of the liquid crystal display panel. It is preferable to use a seal not containing any spacers in the case where any portion of the peripheral region 50B has a width which is 6 mm or more. In the case where a seal not containing any spacers is used, it is preferable to dispose the aforementioned columnar spacing structures also in the region where the seal is provided.

If a seal not containing any spacers is used in the case where the width of the peripheral region 50B is smaller than 6 mm (i.e., relatively few columnar spacing structures are provided outside the display region), unevenness in luminance may occur in the display region, due to cell gap variations. Around the display region of the liquid crystal panel, not only the peripheral region (which extends from the outer boundary of the display region to the outer boundary of the seal) but also a terminal region(s) is provided further outside. Such a terminal region is exposed in order to allow electrical connections to made therein, and is not overlapped by the opposing substrate. Therefore, no spacing structures are required in the terminal region. Moreover, in general, a liquid crystal panel is produced by attaching together a pair of mother substrates and then cutting the mother substrates into respective panels. Therefore, during the attaching process, it is expected that there exists a region (lying on the further outside of the peripheral region and the terminal region) which is to be removed when each liquid crystal panel is cut out from the mother substrate. Although such a region is not a part of the liquid crystal panel, it still affects the cell gap in the display region during the mother substrate attaching process. Therefore, it is preferable to provide columnar spacing structures in any such region, in order to maintain a uniform cell gap. Alternatively, it would be possible to prescribe the spring modulus Kpt' per unit area of peripheral region so as to be even smaller than the aforementioned value 0.5×Kpt, and include spherical or fibrous spacers within the seal 55C which is provided in the peripheral region for effecting substrate adhesion, thus realizing a uniform cell gap. In this case, the columnar spacing structures 52b in the peripheral region may be omitted.

It must be noted that, in the case where the columnar spacers in the peripheral region are higher than in the display region, or where Kpt<<Kpt' even if the columnar spacer height is the same in both the peripheral region and the display region, the aforementioned cell gap adjustment which is based on spacers within the seal cannot be performed, and a high cell gap may result. Note that, in a so-called VA mode liquid crystal display device, which employs a liquid crystal layer of a vertical orientation type, it is preferable that the cell gap in the peripheral region surrounding the display region is in the range of −0.3 µm to +0.1 µm relative to the cell gap in the display region. The reason why there is a larger margin on the minus side is that unevenness in luminance is less likely to be perceived in the case where the cell gap in the peripheral region is smaller than the cell gap in the display region (which lies inside the peripheral region) than in the case where the cell gap in the peripheral region is greater than the cell gap in the display region. The likelihood with which cell gap variations will be visually recognized as unevenness in luminance depends on the display mode (i.e., orientation state in the liquid crystal layer). Therefore, the cell gap may be controlled with a required precision.

According to the present invention, an optimum configuration and distribution density of columnar spacers for realizing a liquid crystal display device having reduced "low-temperature voids", "lower bulging", and "pressure-induced unevenness" can be obtained more easily than conventionally. Furthermore, cell gap uniformity in the neighborhood of the display region can be ensured in the case where columnar spacers are employed. As a result, it is possible to shorten the development timeline, and reduce development costs (e.g., mask costs), while conserving display quality.

In particular, the present invention is suitably applicable to the production of a liquid crystal display device of any of a number of recently growing display modes whose principles allow perception of display unevenness due to cell gap non-uniformity, e.g., a VA mode or an IPS mode utilizing birefringence of liquid crystal, or a TN mode employing a phase difference film designed for wide-range viewing angles. Production of large-size liquid crystal panels, which are mainly used for TV applications, employs large-sized masks, thus leading to very high costs. In such fields, the present invention provides a particularly outstanding effect of reducing the panel development cost and timeline. Moreover, a large-size liquid crystal panel requires a larger amount of liquid crystal material to be injected than does a small-sized liquid crystal panel, and therefore a large-size liquid crystal panel is likely to suffer from lower bulging problems. This is another reason why the present invention can provide a particularly outstanding effect.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) on Patent Applications No. 2004-165597 filed in Japan on Jun. 3, 2004, and No. 2005-154519 filed in Japan on May 26, 2005, the entire contents of which are hereby incorporated by reference.

What is claimed is:

1. A liquid crystal display device comprising, in a display region, a plurality of columnar spacing structures provided between a pair of substrates; wherein
   each of the plurality of columnar spacing structures including at least one resin layer;
   wherein a spring modulus Kps of the columnar spacing structures per unit area is within a range of no less than 0.48 mN/$\mu$m$^3$ and no more than 0.72 mN/$\mu$m$^3$;
   an area ratio P of the columnar spacing structures is within a range of no less than 0.00016 and no more than 0.00493; and
   a spring modulus Kpt per unit area of display region is within a range of no less than 0.00008 mN/$\mu$m$^3$ and no more than 0.00237 mN/$\mu$m$^3$, the spring modulus Kpt being defined as Kps×P=k×n/S, where k is a spring modulus of each columnar spacing structure (mN/$\mu$m); S is an area of a display region; and n is a number of columnar spacing structures in the display region.

2. The liquid crystal display device according to claim 1, wherein the spring modulus Kpt per unit area of display region is equal to or greater than 0.00018 mN/$\mu$m$^3$.

3. The liquid crystal display device according to claim 1, wherein the spring modulus Kpt per unit area of display region is equal to or less than 0.0005 mN/$\mu$m$^3$.

4. The liquid crystal display device according to claim 1, wherein each of the plurality of columnar spacing structures includes a plurality of resin layers.

5. The liquid crystal display device according to claim 4, wherein the plurality of resin layers include at least one colored resin layer.

6. The liquid crystal display device according to claim 5, wherein the at least one colored resin layer includes colored resin layers of three different colors.

7. The liquid crystal display device according to claim 5, wherein the plurality of resin layers include a resin layer formed on the at least one colored layer.

8. The liquid crystal display device according to claim 7, wherein the plurality of columnar spacing structures further include a transparent conductive layer formed between the resin layer formed on the at least one colored layer and the at least one colored layer.

9. The liquid crystal display device according to claim 1, further comprising a black matrix, wherein the plurality of columnar spacing structures are formed on the black matrix.

10. The liquid crystal display device according to claim 1, comprising a plurality of further columnar spacing structures in a peripheral region surrounding the display region, wherein a spring modulus Kpt' per unit area of peripheral region satisfies the relationship 0.5×Kpt≦Kpt'<Kpt, the spring modulus Kpt' being defined as k×n'/S', where S' is an area of the peripheral region; and n' is a number of further columnar spacing structures in the peripheral region.

11. The liquid crystal display device according to claim 1, comprising a plurality of further columnar spacing structures in a peripheral region surrounding the display region, wherein,
   each of the plurality of columnar spacing structures includes a plurality of resin layers; and
   each of the plurality of further columnar spacing structures lacks at least one of the plurality of resin layers included in each of the plurality of columnar spacing structures.

12. The liquid crystal display device according to claim 1, wherein,
   the liquid crystal layer is of a vertical orientation type; and
   a cell gap in a peripheral region surrounding the display region is in a range from −0.3 $\mu$m to +0.1 $\mu$m with respect to a cell gap in the display region.

13. The liquid crystal display device according to claim 1, further comprising, in a peripheral region surrounding the display region, a seal for allowing the pair of substrates to adhere to each other, the seal containing spacers.

14. The liquid crystal display device according to claim 1, further comprising, in a peripheral region surrounding the display region, a seal for allowing the pair of substrates to adhere to each other, the seal containing no spacers.

15. The liquid crystal display device according to claim 12, wherein at least a portion of the peripheral region surrounding the display region has a width of 6 mm or more.

16. The liquid crystal display device according to claim 14, wherein at least a portion of the peripheral region surrounding the display region has a width of 6 mm or more.

17. A substrate to be used in the liquid crystal display device according to claim 1, the substrate comprising the plurality of columnar spacing structures.

* * * * *